United States Patent Office.

EMANUEL MERCK, OF DARMSTADT, HESSE, GERMANY.

PROCESS OF OBTAINING PEPTONE.

SPECIFICATION forming part of Letters Patent No. 369,729, dated September 13, 1887.

Application filed July 14, 1886. Serial No. 207,983. (No specimens.) Patented in Germany March 2, 1884, No. 29,714, and October 6, 1885, No. 35,724; in Belgium June 28, 1886, No. 73,646; in England June 28, 1886, No. 8,468; in Luxemburg June 29, 1886, No. 706, and in Italy June 30, 1886, XLIII 31 and XX 20,171.

*To all whom it may concern:*

Be it known that I, EMANUEL MERCK, manufacturer, a subject of the Emperor of Germany, residing at Darmstadt, 9 Rhein Strasse, Grand Dukedom of Hesse, German Empire, have invented certain new and useful Improvements in the Manufacture of Peptone, (for which Letters Patent have been granted in Germany, Nos. 29,714 and 35,724, dated, respectively, March 2, 1884, and October 6, 1885; Belgium, No. 73,646, dated June 28, 1886; Luxemburg, No. 706, dated June 29, 1886; Italy, Nos. 31/20,171, dated June 30, 1886, and Great Britain, No. 8,468, dated June 28, 1886;) and I do hereby declare the following to be a full, clear, and exact description of the invention, such as will enable others skilled in the art to which it appertains to make and use the same.

This invention relates to the production of peptone from the so-called "nucleoproteines" and elimination or separation of the nuclein from the peptone.

Under nucleoproteines are comprehended such albuminous substances that in peptonization, whether in a neutral acid or alkaline solution, are decomposed into the so-called "nuclein" and "protein." Such albuminous bodies are found, for example, in liver, in the yolk of eggs, and in milk.

The invention consists, essentially, in a novel process of obtaining the peptone free from nuclein, substantially as hereinafter fully described, and as set forth in the claim.

In the process of obtaining peptone free from nuclein from the nucleoproteines—as, for instance, from the caseine of milk—I proceed as follows: I suspend the caseine in about twice its volume of water, or in a very attenuated acid or alkaline solution—as, for instance, in a solution of sulphuric acid or in a solution of potash. I neutralize the solution by the addition of one percentum of a ferment, (or a substance containing a ferment,) having a peptonizing action in either of the solutions employed, and digest the same at a temperature of about 40° centigrade for about twelve hours, or until the nuclein precipitate resulting from the neutralization ceases to increase. On the completion of the reaction the fluid is neutralized and the resulting precipitate is eliminated by filtration. The filtrate, which is caseine-peptone, is evaporated. The caseine-peptone is thus obtained in the form of a sirup, and may be used as such; or the filtrate may be treated with alcohol, whereby the caseine-peptone is precipitated in the form of flakes, which, after separation by filtration, may be dried and converted into a pulverulent form for use, or the sirup may be converted into a pulverulent form by atomizing in a current of compressed air.

Having now described my invention, what I claim, and desire to secure by Letters Patent, is—

The herein-described process of obtaining peptone from nucleoproteines under elimination of the nuclein, which consists in treating a solution thereof, either neutral acid or alkaline, with a ferment, or a substance containing a ferment having a peptonizing action in such solution, substantially as described, for the purposes specified.

In testimony whereof I affix my signature in presence of two witnesses.

EMANUEL MERCK.

Witnesses:
JAMES HENRY SMITH,
CARL ED. HAHN.